United States Patent [19]

Andre

[11] Patent Number: 4,614,321
[45] Date of Patent: Sep. 30, 1986

[54] PIPE CLIP

[75] Inventor: Guy Andre, Seyssinet-Pariset, France

[73] Assignee: A. Raymond, Lorrach, Fed. Rep. of Germany

[21] Appl. No.: 728,273

[22] Filed: Apr. 29, 1985

[30] Foreign Application Priority Data

Apr. 30, 1984 [DE] Fed. Rep. of Germany ....... 3416020

[51] Int. Cl.[4] .................................... F16L 3/08
[52] U.S. Cl. ..................................... 248/74.2; 24/555; 248/316.7
[58] Field of Search ............. 248/74.2, 74.5, 74.1, 248/73, 316.7, 316.1, 316.5; 24/555, 545

[56] References Cited

U.S. PATENT DOCUMENTS 2,166,916  7/1939  Lombard ............. 248/74.2 X
2,657,890  11/1953 Atkins ................ 248/74.1
3,944,177  3/1976  Yoda .................. 248/73 X

FOREIGN PATENT DOCUMENTS 0018597  11/1980  European Pat. Off. .......... 248/74.2
2734753  2/1979   Fed. Rep. of Germany .
2914431  4/1980   Fed. Rep. of Germany ........ 248/73
2385966  12/1978  France ........................... 248/74.3
1338325  11/1973  United Kingdom ............... 248/73

Primary Examiner—Ramon O. Ramirez
Attorney, Agent, or Firm—Finnegan, Henderson, Farabow, Garrett & Dunner

[57] ABSTRACT

A pipe clip comprising a flexible, yet relatively stiff U-shaped holder having two upwardly extending sidewalls with each having a catch element at its upper end and an auxiliary holder open at the top and of relatively softer elastic material. The auxiliary holder receives the pipe and is pressed down into the open top of the U-shaped holder where it is held in place by catch elements of the U-shaped holder and closed about a major portion of the periphery of the pipe. The auxiliary holder also has outwardly extending projections that initially engage behind the catch elements of the U-shaped holder to hold the auxiliary holder in position for receipt of the pipe before it is pressed and locked into place in the U-shaped holder.

2 Claims, 2 Drawing Figures

PIPE CLIP

BACKGROUND OF THE INVENTION

The invention relates to a clip for holding pipe, tubing or the like consisting of a flexible, yet stiff U-shaped holder which surrounds the pipe with clearance and has at each of its upper free ends a barb-shaped catch element, and an auxiliary holder also open at the top and adapted to closely embrace the pipe or tubing over the major part of its periphery. The auxiliary holder has catch surfaces cooperating with the catch elements of the U-shaped holder, and is shaped so that it can be pressed into the open side of the U-shaped holder and retained therein by the catch elements.

Pipe clips of this type are particularly useful for fastening brake lines to automobile bodies. Because of the use of an auxiliary holder in combination with a U-shaped holder having barb-shaped catch elements for retaining the auxiliary holder in place, the clip has the advantage of relatively easy assembly together with great retaining power.

A pipe clip of this type is known from German patent publication DE No. 27 34 753. In one construction, the auxiliary holder is provided with a split peg that is inserted into a corresponding peg hole in the bottom of the U-shaped holder to hold it in place. In another construction shown in the patent, the auxiliary clip is tethered to the U-shaped holder by a flexible soft strap, which holds it in position, ready for assembly, above the holder. Thus here the U-shaped holder and the auxiliary holder are supplied in the form of a single unit ready for assembly. However, because of the peg or the connecting strap, it is necessary that the U-shaped holder and the auxiliary holder be made of the same material and possess the same degree of elasticity.

It is now desired to utilize this type of pipe clip to fasten the brake lines of a so-called anti-locking brake system, but the vibrations inherent in such a system are unfortunately transmitted to the vehicle body through such a clip and give rise to undesirable chatter. For this reason, a damping layer is usually provided between the pipe clip and the body, but providing the damping layer involves additional consumption of time and material.

SUMMARY OF THE INVENTION

Accordingly, an object of the invention is to provide a two part pipe clip in which a damping effect is achieved without the need for an additional damping layer.

In accordance with the present invention, this is achieved by providing a pipe clip comprising a flexible, yet relatively stiff U-shaped holder having two upwardly extending sidewalls with each having a catch element at its upper end and an auxiliary holder for the pipe that is also open at the top and of relatively softer elastic material. The auxiliary holder is shaped so that it can be pressed into the open top of the U-shaped holder and be held in place by the catch elements of the U-shaped holder and at the same time be closed about and thereby provide a cushion for a major portion of the periphery of the pipe. The auxiliary holder is further provided with outwardly extending projections that initially engage behind the catch elements of the U-shaped holder to hold the auxiliary holder in ready position for receipt of the pipe before it is pressed and locked into place in the U-shaped holder.

BRIEF DESCRIPTION OF THE DRAWINGS

Further features and advantages of the invention can be seen from the drawings, in conjunction with the following description of a preferred embodiment. In the drawing.

DETAILED DESCRIPTION

Figure 1:
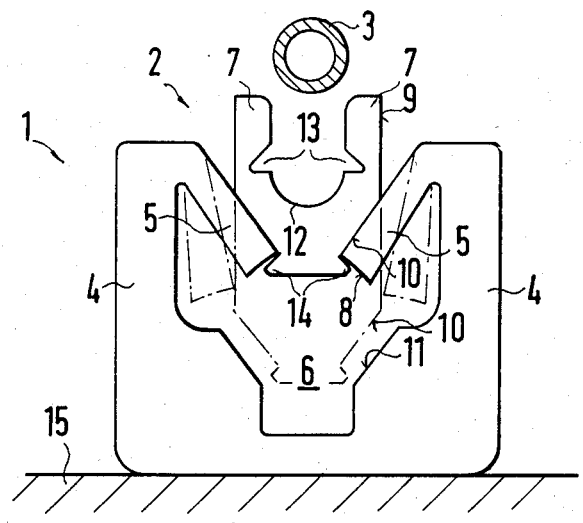
FIG. 1 shows a pipe clip with the U-shaped holder and the auxiliary holder in a position ready for assembly.

The pipe clip shown in the drawings consists essentially of a flexible, yet stiff U-shaped holder 1 of material possessing hard elasticity, such as plastic, and of an auxiliary holder 2 of material possessing a relatively softer elasticity, such as rubber. The pipe clip serves to secure a piece of tubing or a pipe 3 in place, particularly a brake line for the hydraulically operated brakes of an automobile.

Figure 2:
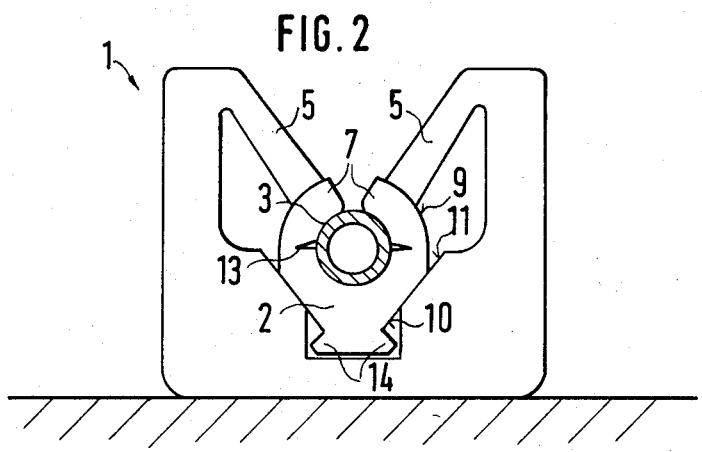
FIG. 2 shows the pipe clip in its assembled position.

Holder 1 is U-shaped, and its two side walls 4 surround the pipe 3 required to be held, at a distance therefrom sufficient to permit insertion of the auxiliary holder 2. At the upper ends of the two side walls 4 are two barb-shaped arms 5, which point obliquely towards the center of the receiving space 6 of the holder and which can be pressed apart to the position shown in dot-dash lines in FIG. 1 upon insertion of auxiliary holder 2 and which thereafter spring back to their original position as shown in FIG. 2.

The auxiliary holder 2 is also essentially U-shaped and open at the top having an inner curved part 12 for receiving pipe 3 and upwardly extending side walls 7. These side walls 7 are also of relatively soft elastic material and thus are curved over towards one another and pressed down firmly onto the top of pipe 3 by the arms 5 of the primary or U-shaped holder 1 as the auxiliary holder is pressed into place. Arms 5 then lie with their edges 8 against corresponding catch surfaces 9 on the outside of the side walls 7, while the inclined base 10 of auxiliary holder 2 rests against corresponding supporting surfaces 11 in U-shaped holder 1, all as shown in FIG. 2.

To enable the side walls 7 to be more easily bent over and pressed into contact with pipe 3, two notches 13 lying opposite one another are provided on the inner sides of side walls 7, at the transition between the bottom curve 12 and the side walls. This ensures that curved part 12 and the side walls 7 of auxiliary holder 2 closely surround and grip the pipe 3 over a major part of its periphery.

To permit a preliminary connection between U-shaped holder 1 and its auxiliary holder 2 so that the pipe clip can be supplied as a single unit and to aid in the insertion of the pipe 3 into auxiliary holder 2, auxiliary holder 2 is provided at the end of the inclined surfaces 10 with two outwardly extending projections 14. These projections initially engage behind or under the edges 8 of arms 5 when the inclined surfaces 10 of holder 2 lie against the outside surfaces of arms 5. This holds auxiliary holder 2 captive to U-shaped holder 1 ready for receipt of pipe 3 prior to assembly. See FIG. 1. In this way the pipe clip can be first secured to a support 15, for example a body panel of an automobile by one of any known methods, and then it is ready to receive and provide a cushioned mounting for a brake line 3 simply by thereafter inserting pipe 3 into holder 2 and pressing holder 2 into holder 1 until it is locked in place.

I claim:

1. A clip for a pipe comprising a flexible, yet relatively stiff U-shaped holder having two upwardly extending sidewalls forming an open top with each sidewall having an arm at its upper end that points obliquely down toward the center of the U-shaped holder and an auxiliary holder open at the top and of relatively softer elastic material, said auxiliary holder also being U-shaped and having two upwardly extending side walls and being adapted to receive the pipe and be pressed into the open top of the U-shaped holder where it is held in place by the arms of the U-shaped holder and closed about a major portion of the periphery of the pipe, said auxiliary holder having two projections extending outwardly from the lower part of its base that initially engage behind the arms of the U-shaped holder to hold the auxiliary holder with its top open in position for receipt of the pipe, said arms being pressed apart by the auxiliary holder as it is pressed into place and which arms thereafter snap back and rest against the closed side walls of the auxiliary holder after it has been completely pressed into the U-shaped holder to hold it in place.

2. The clip of claim 1, wherein the inner surface of the base of the U-shaped auxiliary holder is shaped to fit the pipe and the side walls of the auxiliary holder are each provided on their inner side, at the transmission between the shaped part and the walls, with a notch, so that the side walls are pressed towards one another and bent around the pipe by the arms as the auxiliary holder is pressed down into the U-shaped holder.

* * * * *